(12) United States Patent
Ku

(10) Patent No.: US 8,210,064 B2
(45) Date of Patent: Jul. 3, 2012

(54) ACTUATOR FOR LIFTING DEVICE

(75) Inventor: Cheng-Hu Ku, Jhongli (TW)

(73) Assignee: Moteck Electric Corp., Sijhih (TW)

( * ) Notice: Subject to any disclaimer, the term of this patent is extended or adjusted under 35 U.S.C. 154(b) by 408 days.

(21) Appl. No.: 12/551,570

(22) Filed: Sep. 1, 2009

(65) Prior Publication Data
US 2010/0139429 A1 Jun. 10, 2010

(30) Foreign Application Priority Data
Dec. 5, 2008 (TW) ................................ 97221891 U

(51) Int. Cl.
*F16H 3/06* (2006.01)
*F16H 27/02* (2006.01)
*F16H 29/02* (2006.01)
*F16H 29/20* (2006.01)

(52) U.S. Cl. ..................... 74/89.39; 74/89.38
(58) Field of Classification Search ............. 74/89.14, 74/89.23, 89.38, 89.39
See application file for complete search history.

(56) References Cited

U.S. PATENT DOCUMENTS

| | | | | |
|---|---|---|---|---|
| 4,431,093 | A * | 2/1984 | Yang | 188/378 |
| 4,940,321 | A * | 7/1990 | Yoshida | 359/874 |
| 5,046,376 | A * | 9/1991 | Baker | 74/89.39 |
| 6,158,295 | A * | 12/2000 | Nielsen | 74/89.38 |
| 2004/0093969 | A1* | 5/2004 | Nielsen | 74/89.23 |
| 2006/0243075 | A1* | 11/2006 | Liou et al. | 74/89.39 |

* cited by examiner

*Primary Examiner* — Justin Krause
(74) *Attorney, Agent, or Firm* — Muncy, Geissler, Olds & Lowe, PLLC

(57) ABSTRACT

An actuator includes a base, a motor mounted on the base for driving a worm to rotate a worm gear of a transmission gear set that is set in an accommodation chamber inside the base and has a gear shaft pivotally inserted through the worm gear and fixedly mounted with an output gear, a brake module rotatable with said worm gear, a linking rod assembly having a driven gear meshed with the output gear, a screw rod rotatable with the driven gear, a movable member threaded onto the screw rod and an extension rod connected to the movable block and movable in and out of a sleeved outside the base upon rotation of the screw rod for biasing a crane beam of a lifting device.

12 Claims, 11 Drawing Sheets

ACTUATOR FOR LIFTING DEVICE

This application claims the priority benefit of Taiwan patent application number 097221891 filed on Dec. 5, 2008.

BACKGROUND OF THE INVENTION

1. Field of the Invention

The present invention relates to an actuator for lifting device and more particularly, to such an actuator, which comprises a linking rod assembly for moving a lifting device, and a transmission gear set and a brake module arranged at one side of the linking rod assembly and rotatable by a motor to move the linking rod assembly in extending out or retracting an extension tube.

2. Description of the Related Art

A lifting device is a mechanism for changing the elevation of an object. Different lifting devices differently configured to fit different application requirements.

FIG. 11 illustrates an actuator A for use in a lifting device. As illustrated, the actuator A comprises an electric motor A1 having a worm A11 fixedly connected to the output shaft thereof, a worm gear A2 meshed with the worm A11, a spiral spring A3 sleeved onto the gear shaft of the worm gear A2, and a retractable rod A4 coupled to the worm gear A2. According to this design, the retractable rod A4 and the worm gear A2 are on the same axis. When starting the electric motor A1, the worm A11 is driven to rotate the worm gear A2, the retractable rod A4 is moved axially subject to rotation of the worm gear A2, and the spiral spring A3 is wound tightly on the periphery of the gear shaft of the worm gear A2.

The aforesaid prior art actuator provides a braking effect to prevent an accident, however it still has drawbacks as follows:

1. Because the retractable rod A4, the spiral spring A3 and the worm gear A2 are arranged on one same path, the worm bear A2 occupies a part of the reciprocating path of the retractable rod A4. Thus, the length of the retractable rod A4 is limited, lowering the performance of the actuator.

2. The worm gear A2 is directly connected in series to one end of the retractable rod A4. When the retractable rod A4 receives an external pressure, the pressure will be directly transferred by the retractable rod A4 to the worm gear A2. If the worm gear A2 is held down by the spiral spring A3 at this time, direct transfer of the external pressure by the retractable rod A4 to the worm gear A2 may damage the worm gear A2 and the spiral spring A3.

SUMMARY OF THE INVENTION

The present invention has been accomplished under the circumstances in view. It is the main object of the present invention to provide an actuator for lifting device that eliminates the drawbacks of the aforesaid prior art design.

To achieve this and other objects of the present invention, an actuator comprises a base, a motor mounted on the base for driving a worm to rotate a worm gear of a transmission gear set that is set in an accommodation chamber inside the base and has a gear shaft pivotally inserted through the worm gear and fixedly mounted with an output gear, a brake module rotatable with said worm wear, a linking rod assembly having a driven gear meshed with the output gear, a screw rod rotatable with the driven gear, a movable member threaded onto the screw rod and an extension rod connected to the movable member and movable in and out of a sleeved outside the base upon rotation of the screw rod for biasing a crane beam of a lifting device.

The transmission gear set and the brake module are arranged in a parallel manner relative to the linking rod assembly for transferring a rotary driving force from the motor to the driven gear of the linking rod assembly. Therefore, the moving range of the movable block on the screw rod of the linking rod assembly can be maximized, i.e., the stroke of the extension tube can be maximized, enhancing the performance of the actuator.

Further, because the transmission gear set and the brake module are arranged in a parallel manner relative to the linking rod assembly, the driven gear will be rotated with the screw rod to rotate the output gear of the transmission gear set and then the clutch of the brake module when the extension tube of the linking rod assembly is forced backwards by an external force, causing the torsional spring of the stop device to be fastened tight to the periphery of the locating tube to provide braking action. This design enables any external force applied to the extension tube to be effectively buffered, preventing direct transfer of the force through the transmission gear set to the brake module to damage the brake module.

Further, by means of wide and thick configurations of the protruding strips of the first push block and second push block of the stop device of the brake module, the protruding strips of the first push block and second push block of the stop device will not break or deform during rotation of the first push block and the second push block to push the end portions of the torsional spring.

DETAILED DESCRIPTION OF THE PREFERRED EMBODIMENT

Figure 1:
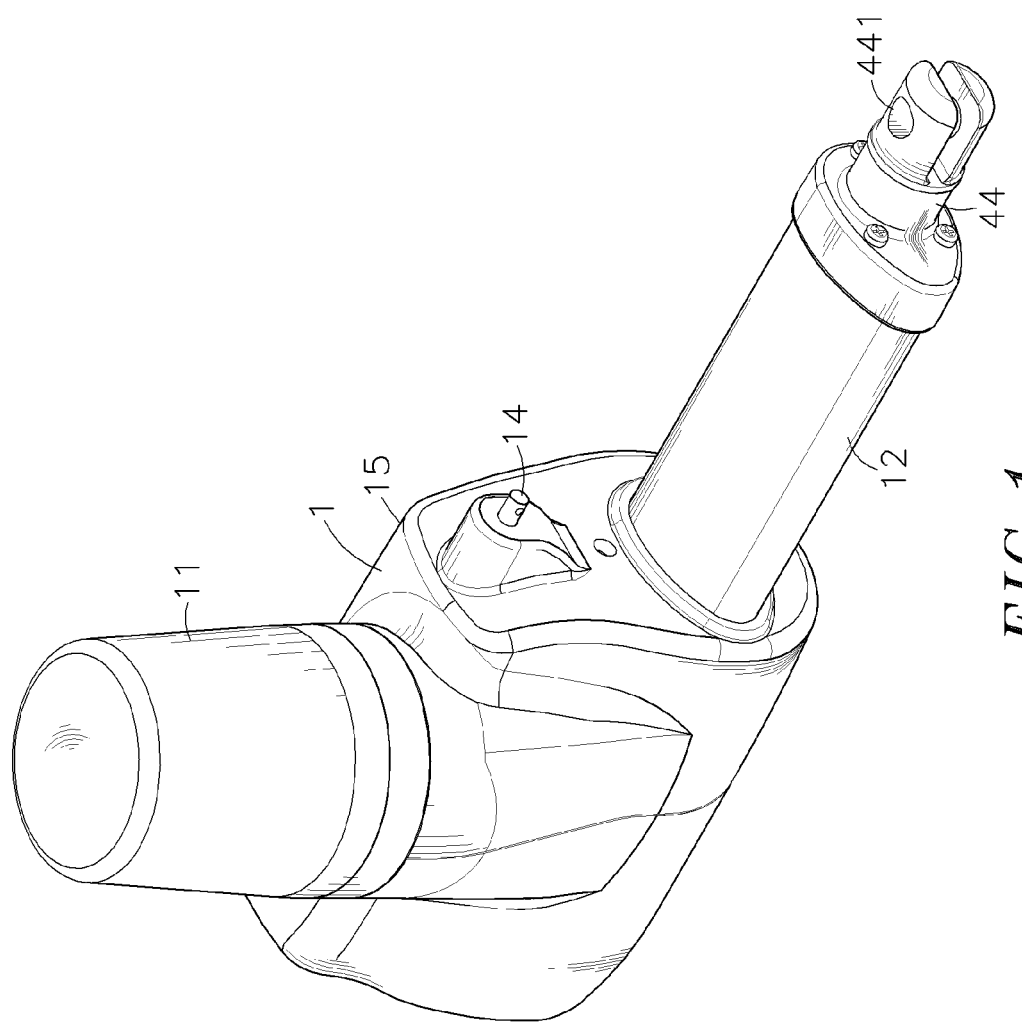
FIG. 1 is an elevational view of an actuator in accordance with the present invention.

Referring to FIGS. 1~5, an actuator for lifting device in accordance with the present invention is shown comprising a base 1, a transmission gear set 2, a brake module 3, and a linking rod assembly 4.

The base 1 is covered with a shell 15. Further, the base 1 holds a motor 11 on the top side thereof. The motor 11 is adapted to rotate a worm 111 that extends to an accommodation chamber 10 inside the base 1. Further, a sleeve 12 is affixed to the front side of the base 1. Further, two micro switches 13 are mounted in front and rear sides inside the sleeve 12.

The transmission gear set 2 comprises a gear shaft 22 pivotally mounted in the accommodation chamber 10, a worm gear 21 pivotally mounted on the gear shaft 22 and meshed with the worm 111, and an output gear 23 fixedly mounted on the gear shaft 22.

The brake module 3 is mounted on the gear shaft 22 of the transmission gear set 2, comprising a stop device 31 sleeved onto the gear shaft 22 and rotatable with the worm gear 21, and a clutch 32 rotatable with the gear shaft 22 and movable to control transmission of rotary driving force from the worm gear 21 to the gear shaft 22. The stop device 31 comprises a first push block 311, a second push block 312, a locating tube 313, a torsional spring 314 and a compression spring 315. The first push block 311 is sleeved onto the gear shaft 22 and rotatable clockwise/counter-clockwise relative to the gear shaft 22, having two protruding strips 3111 perpendicularly extended from the periphery and disposed at two opposite sides in a parallel manner. One protruding strip 3111 has a notch 3112 in one corner of the free end thereof. The second push block 312 is sleeved onto the gear shaft 22 and rotatable clockwise/counter-clockwise relative to the gear shaft 22, having two protruding strips 3121 perpendicularly extended from the periphery in the same extending direction relative to the first push block 311 and disposed at two opposite sides in a parallel manner and a ring toothed block 3123 located one side thereof at the center. One protruding strip 3121 has a notch 3122 at one side. The torsional spring 314 is sleeved onto the locating tube 313, having two opposite end portions 3141 respectively engaged in the notch 3112 of the first push block 311 and the notch 3122 of the second push block 312. The compression spring 315 is mounted on one side of the second push block 312 around the gear shaft 22 and surrounded by the ring toothed block 3123. The clutch 32 comprises an engagement member 321 sleeved onto the gear shaft 22, a locating block 322 affixed to the gear shaft 22, and a cover 323. The engagement member 321 has an internal toothed block 3211 located on the inside, and a ring toothed block 3212 one side for engagement with the ring toothed block 3123. The locating block 322 is mounted on the gear shaft 22 and kept inside the engagement member 321, having a toothed block 3221 for engagement with the internal toothed block 3211 of the engagement member 321. Further, a retaining ring 3222 is fastened to the gear shaft 22 and stopped at one side, namely, the outer side of the locating block 322. The cover 323 is covered on the engagement member 321 to keep the locating block 322 from sight.

The linking rod assembly 4 comprises a driven gear 41 pivotally mounted inside the accommodation chamber 10 and meshed with the output gear 23, a screw rod 42 suspending in the sleeve 12 and axially connected to the driven gear 41 for synchronous rotation, and a movable block 43 threaded onto the driven gear 41 and movable between the two micro switches 13 in the sleeve 12 upon forward/backward rotation of the screw rod 42, and an extension tube 44 movable in and out of the sleeve 12 by the movable block 43. When one micro switch 13 is touched by the movable block 43 during movement of the movable block 43 on the screw rod 42, the respective micro switch 13 cuts off power supply from the motor 11. The extension tube 44 has a connection portion 441 located on the front end thereof opposite to the movable block 43.

The assembly process of the actuator is outlined hereinafter. Set the second push block 312 of the stop device 31 at one side of the first push block 311, and then sleeve the torsional spring 314 onto the locating tube 313 and set the locating tube 313 and the torsional spring 314 in the second push block 312 within the protruding strips 3121 to have the end portions 3141 of the torsional spring 314 be received in gaps between the protruding strips 3111 of the first push block 311 and the protruding strips 3121 of the second push block 312, and then insert the compression spring 315 into the ring toothed block 3123 of the second push block 312, and then install the clutch 32 to fore the ring toothed block 3212 of the engagement member 321 into engagement with the ring toothed block 3123 of the second push block 312 to have the compression spring 315 be stopped between the engagement member 321 and the second push block 312.

Figure 6:
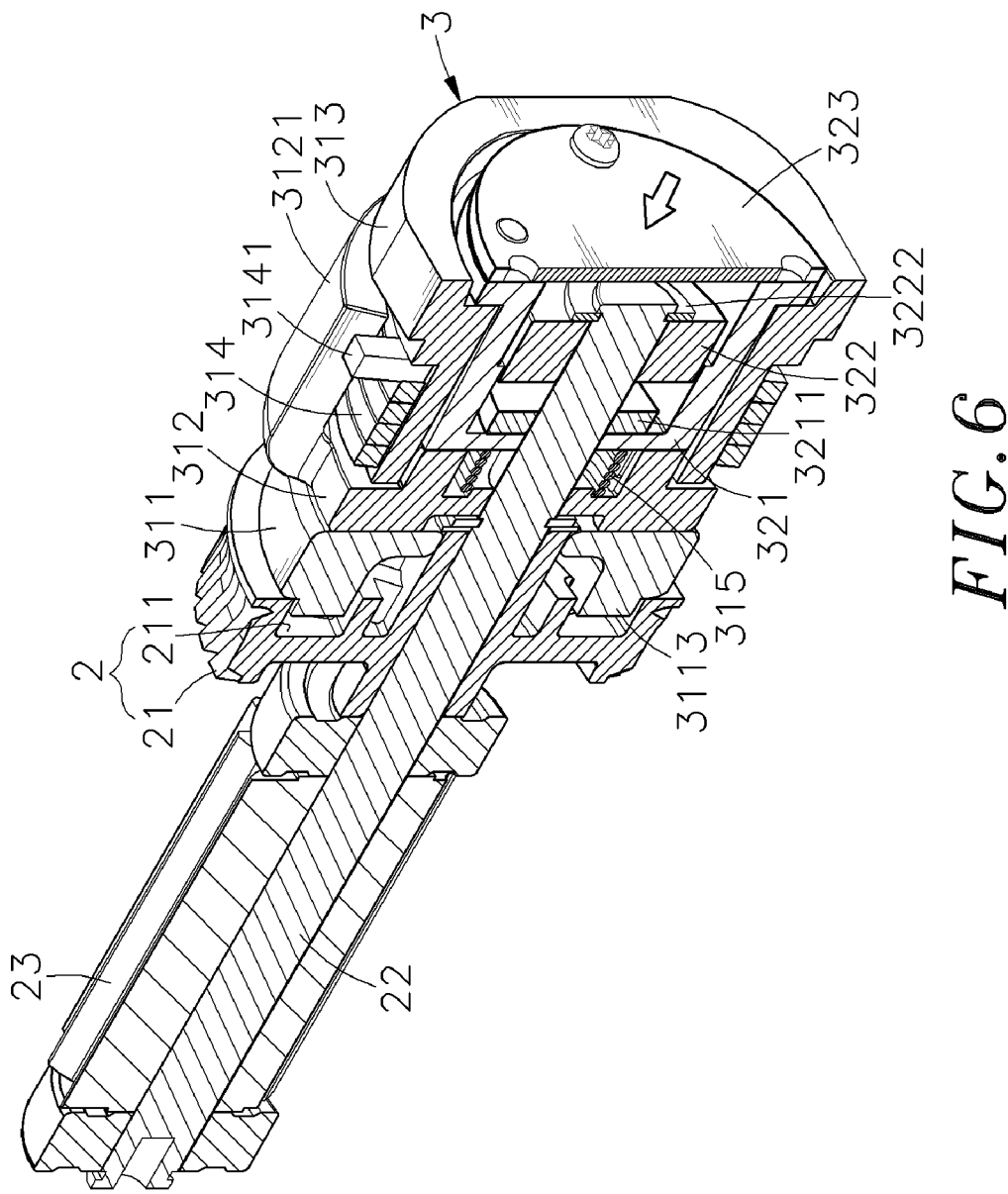
FIG. 6 is a sectional elevation of the actuator in accordance with the present invention.

After engagement between the toothed block 3221 of the locating block 322 and the toothed block 3211 of the engagement member 321, the stop device 31 and the clutch 32 are mounted on the gear shaft 22 to force back teeth 3113 of the first push block 311 into engagement with respective locating holes 211 of the worm gear 21 (see FIG. 6). Further, the gear shaft 22 has a cut plane 221 on the free end thereof fitted into the center (hole) of the locating block 322, and an annular groove 222 extending around the periphery adjacent to the cut plane 221 for the mounting of the retainer ring 3222. After installation of the retaining ring 3222 in the annular groove 222 to prohibit axial displacement of the locating block 322 relative to the gear shaft 22, the cover 323 is fastened to the engagement member 321. Thus, the brake module 3 and the transmission gear set 2 are assembled.

Thereafter, set the transmission gear set 2, the brake module 3 and the linking rod assembly 4 in the accommodation chamber 10 of the base 1 to keep the driven gear 41 in mesh with the output gear 23 and to have the locating tube 313 be affixed to the base 1, and then thread the movable block 43 onto the screw rod 42 outside the base 1, and then connect the extension tube 44 to the movable block 43, and then install the micro switches 13 in the sleeve 12 and then connect the sleeve 12 to the base 1 around the extension tube 44, and then fasten the shell 15 to the base 1 to finish the assembly process of the actuator.

Further, the shell 15 has a top mounting hole 151 (see FIG. 2); the motor 11 has a mounting portion 112 for quick positioning in the top mounting hole 151 of the shell 15. By means of the matching design between the mounting portion 112 and the top mounting hole 151, the motor 11 can be installed in the base 1 or removed from the base 1 easily and rapidly.

Figure 7:
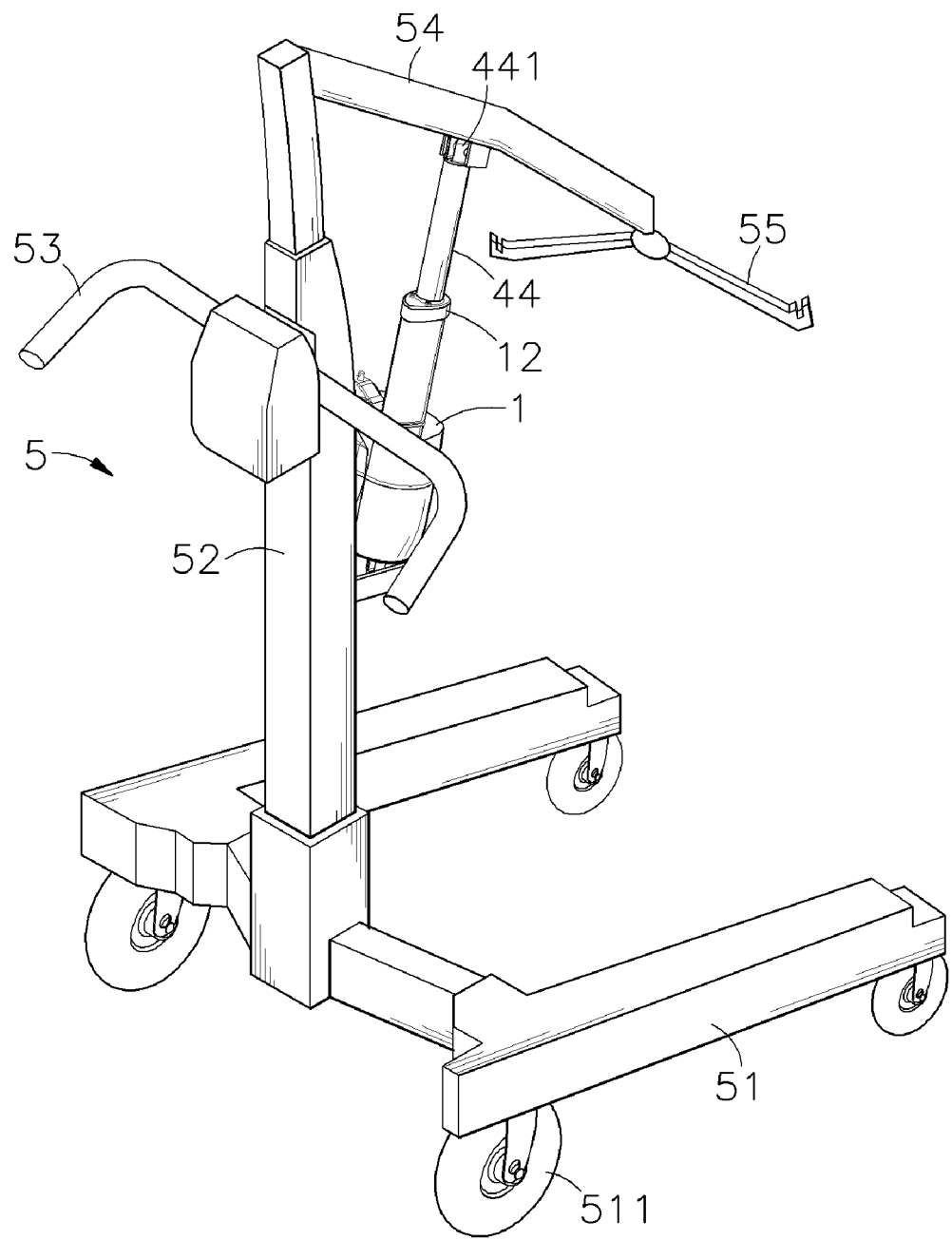
FIG. 7 illustrates an application example of the actuator according to the present invention.
Figure 8:
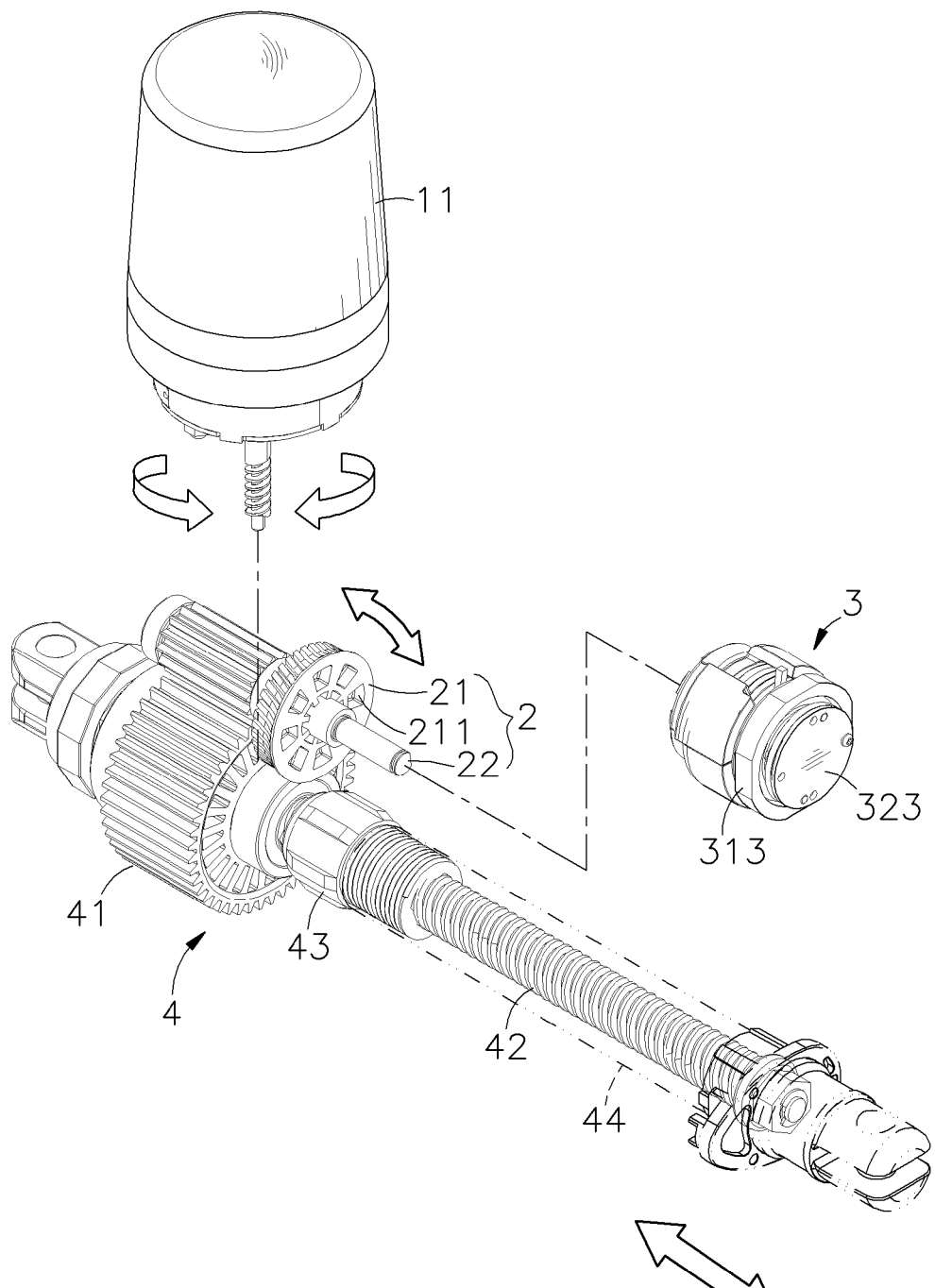
FIG. 8 is a schematic drawing of the present invention, showing the direction of rotation of the transmission gear set and the direction of movement of the movable block and extension rod of the linking rod assembly during rotation of the worm.
Figure 9:
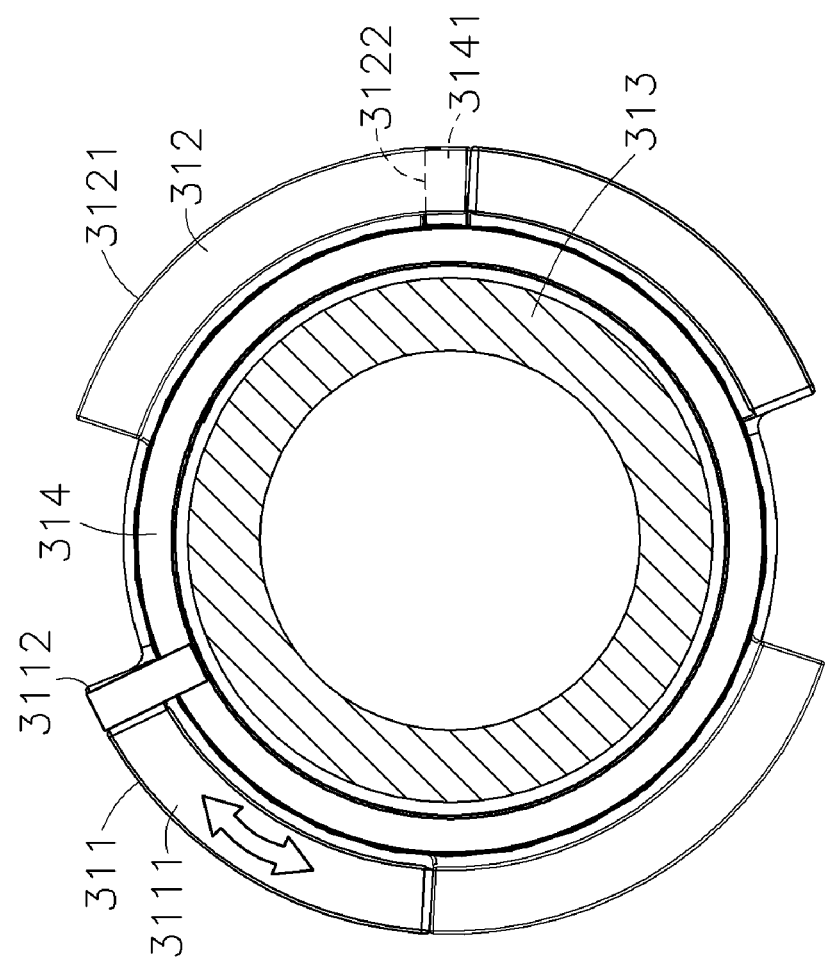
FIG. 9 is a schematic sectional side view of the present invention, showing the operation of the stop device of the brake module (I).
Figure 10:
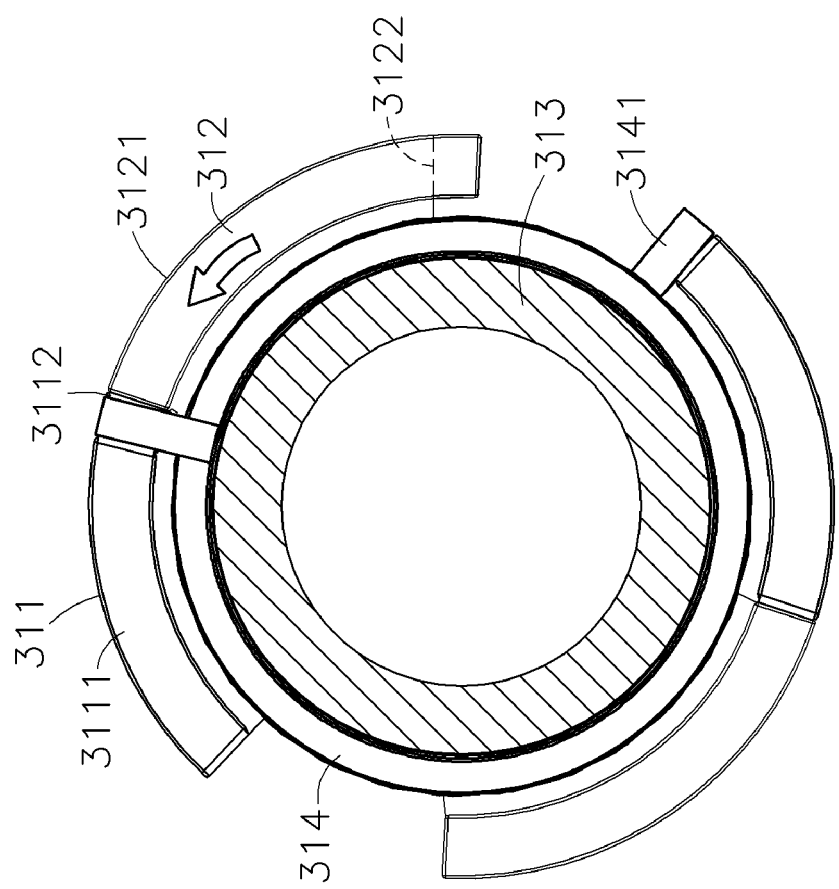
FIG. 10 is a schematic sectional side view of the present invention, showing the operation of the stop device of the brake module (II).
Figure 11:
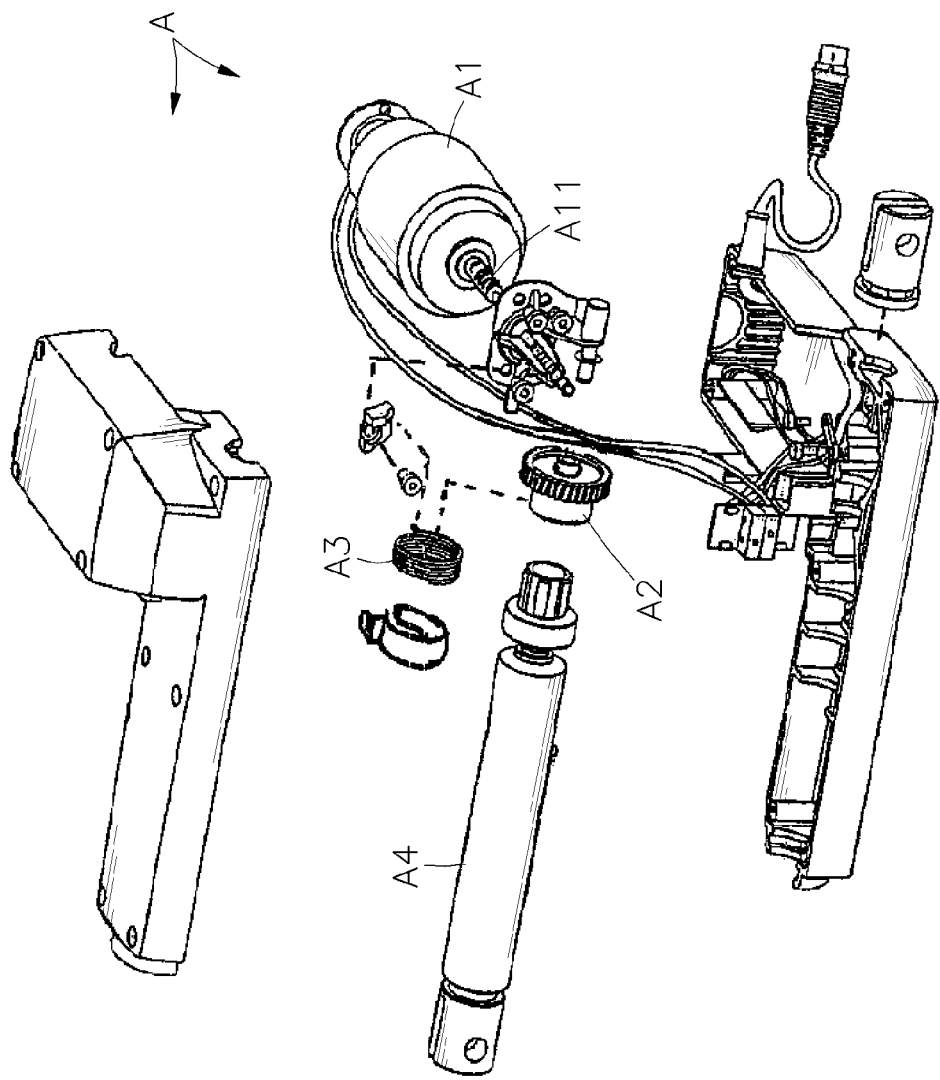
FIG. 11 is an exploded view of an actuator according to the prior art.

Referring to FIG. 7, the actuator can be used in a lifting device 5. The lifting device 5 comprises a base 51 equipped with wheels 511, a retractable rack 52 mounted on the top side of the base 51, a handle 53 mounted on the retractable rack 52, a crane beam 54 coupled to the retractable rack 52, and an arm member 55 located on the distal end of the crane beam 54 for the mounting of a hardness (not shown) for securing the load to be lifted. The base 1 of the actuator is mounted on the retractable rack 52. The connection portion 441 of the extension tube 44 of the linking rod assembly 4 is pivotally connected to the crane beam 54.

Referring to FIG. 2 and FIGS. 4~10, the actuator can be operated in one of the following three operation modes.

(1) In the first operation mode, the motor 11 rotates the worm 111 forwards/backwards to further rotate the first push block 311 forwards/backwards. When rotating the first push block 311 forwards, the protruding strip 3111 of the first push block 311 that carries the notch 3112 is moved toward the associating end portion 3141 of the torsional spring 314 to further force the notch 3112 against one end portion 3141 of the torsional spring 314. Thereafter, the protruding strip 3111 of the first push block 311 will touch one protruding strip 3121 of the second push block 312 to further cause forward the second push block 312 to be rotated forwards. At this time, the respective end portion 3141 is kept retained to the notch 3112 of the protruding strip 3111. When rotating the first push block 311 backwards, the other protruding strip 3111 of the first push block 311 will be forced against one protruding strip 3121 of the second push block 312, and one side of this other protruding strip 3111 will force the other end portion 3141 of the torsional spring 314 into the notch 3122 of the second push block 312 and will further push the second push block 312 to rotate backwards, keeping the respective end portion 3141 of the torsional spring 314 retained to the notch 3122 of the protruding strip 3121. Therefore, either the first push block 311 is rotated forwards or backwards, the protruding strips 3111 of the first push block 311 or the protruding strips 3121 of the second push block 312 can move the end portions 3141, causing the torsional spring 314 to expand the inner diameter for free rotation on the locating tube 313. Because the engagement member 321 of the clutch 32 is meshed with the second push block 312, the second push block 312 is synchronously rotated. Further, because the toothed block 3211 of the engagement member 321 is meshed with the toothed block 3221 of the locating block 322, the locating block 322 is rotated with the engagement member 321. During rotation of the locating block 322, the gear shaft 22 is synchronously rotated, and the output gear 23 is rotated with the gear shaft 22 to rotate the driven gear 41 and the screw rod 42, causing the movable block 43 to carry the extension tube 44 in and out of the sleeve 12.

(2) In the second operation mode, the stop device 31 provides an effective braking effect when the extension tube 44 of the linking rod assembly 4 is forced backwards by an external force. During normal operation, the motor 11 rotates the worm 111 forwards or backwards, and the brake module 3 is driven by the worm 111 to rotate the gear shaft 22 and the output gear 23, and at the same time the driven gear 41 is rotated by the output gear 23 to rotate the screw rod 42, causing the movable block 43 to move the extension tube 44 in or out of the sleeve 12. When the extension tube 44 is pushed backwards by an external force, the movable block 43 will be forced to impart a pressure to the screw rod 42, causing the screw rod 42 rotate in the reversed direction. During reversed rotation of the screw rod 42, the driven gear 41 is rotated with the screw rod 42 to rotate the output gear 23, the gear shaft 22 and the locating block 322, causing the meshed engagement member 321 to rotate the second push block 312. Thus, the second push block 312 directly moves the torsional spring 314. Because the end portions 3141 of the torsional spring 314 are stopped at the protruding strips 3121 of the second push block 312, rotating the second push block 312 causes the torsional spring 314 to be compressed and fastened tight to the periphery of the locating tube 313. When the torsional spring 314 is forced to reduce its inner diameter and to be fastened tight to the periphery of the locating tube 313, the torsional spring 314 provides a stopping effect to stop the second push block 312 from rotation, and therefore the brake module 3 stops the screw rod 42 from reversed rotation, holding the extension tube 44 positively in position against the external force.

Figure 2:
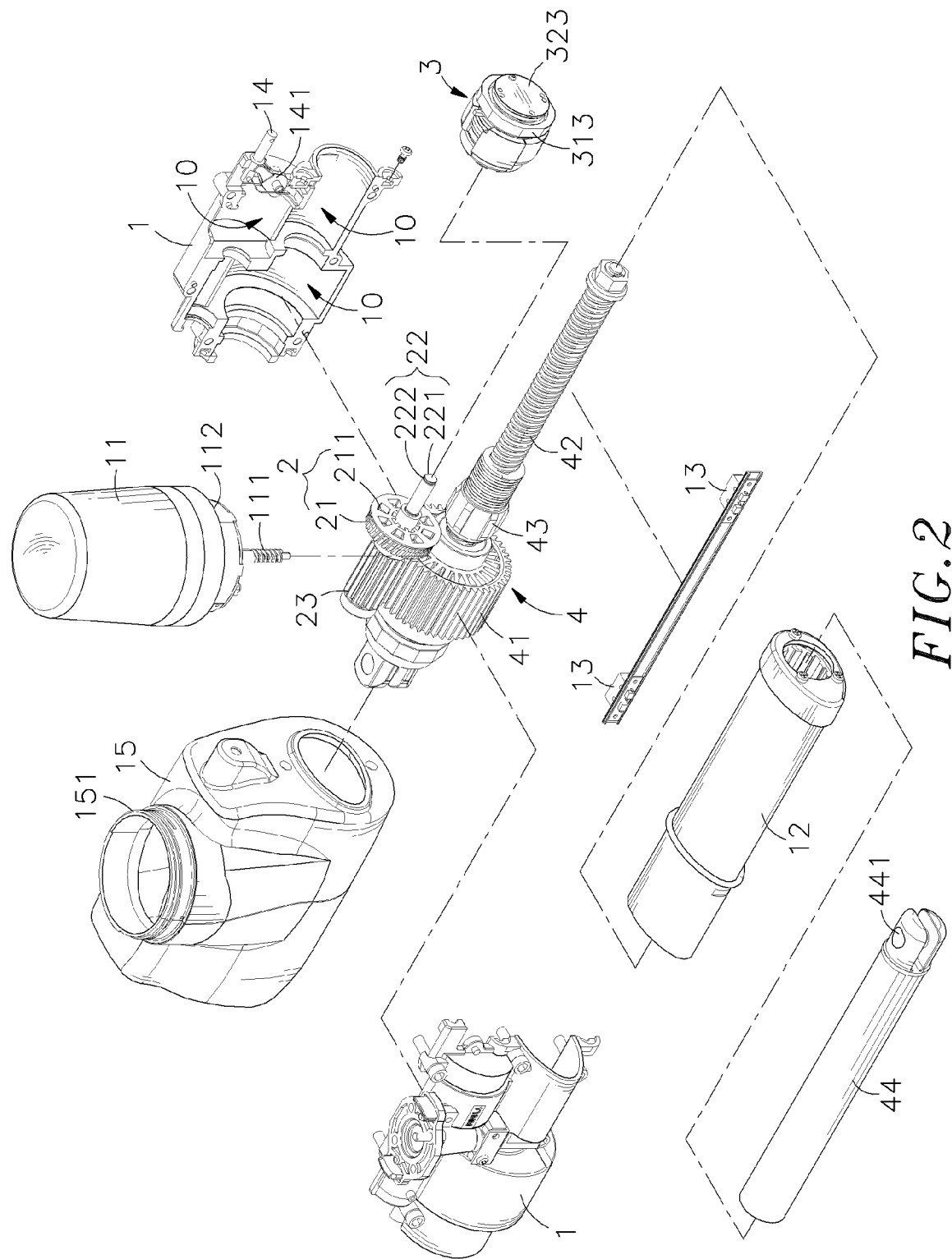
FIG. 2 is an exploded view of the actuator in accordance with the present invention.
Figure 3:
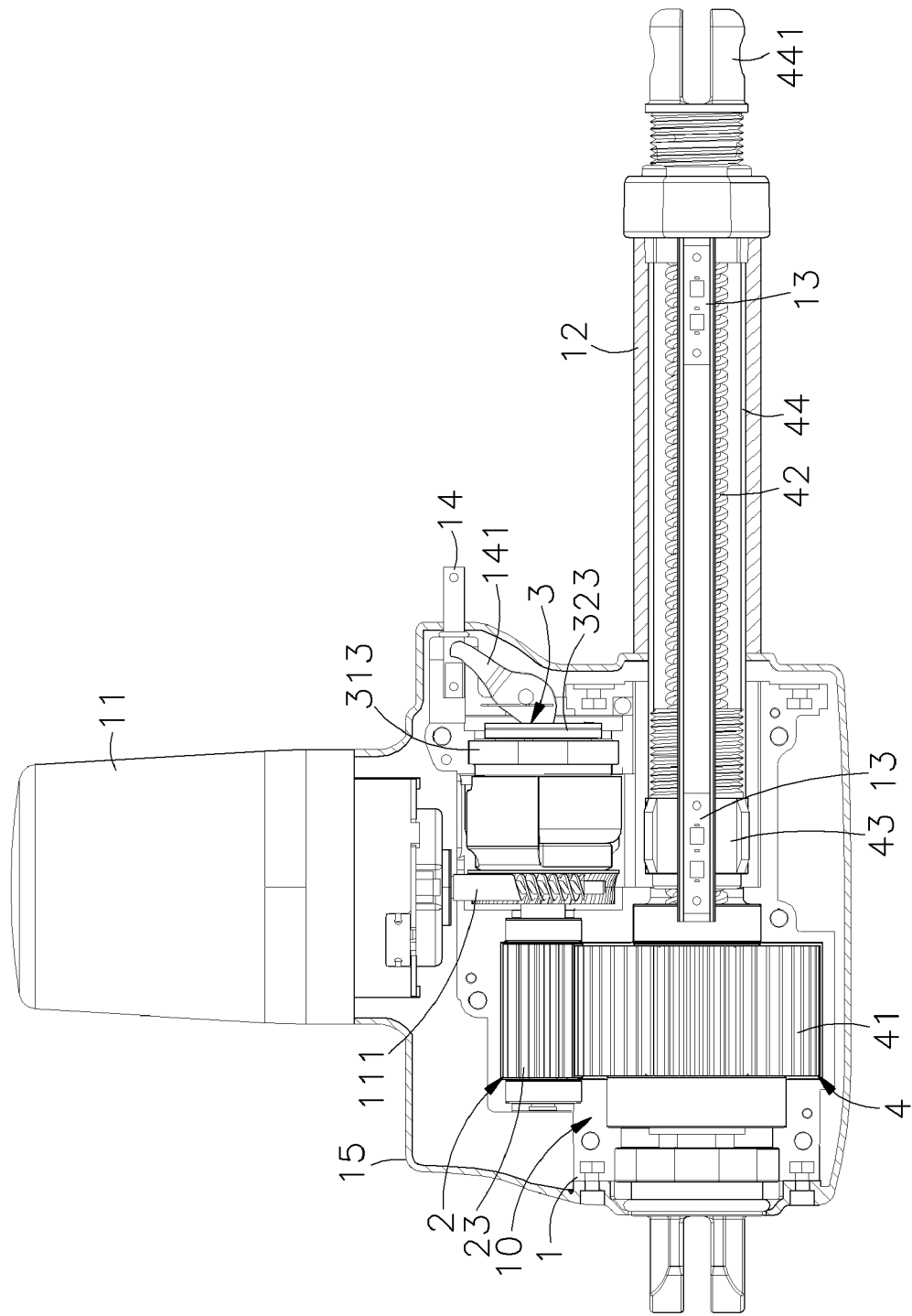
FIG. 3 is a sectional side view of the actuator in accordance with the present invention.
Figure 4:
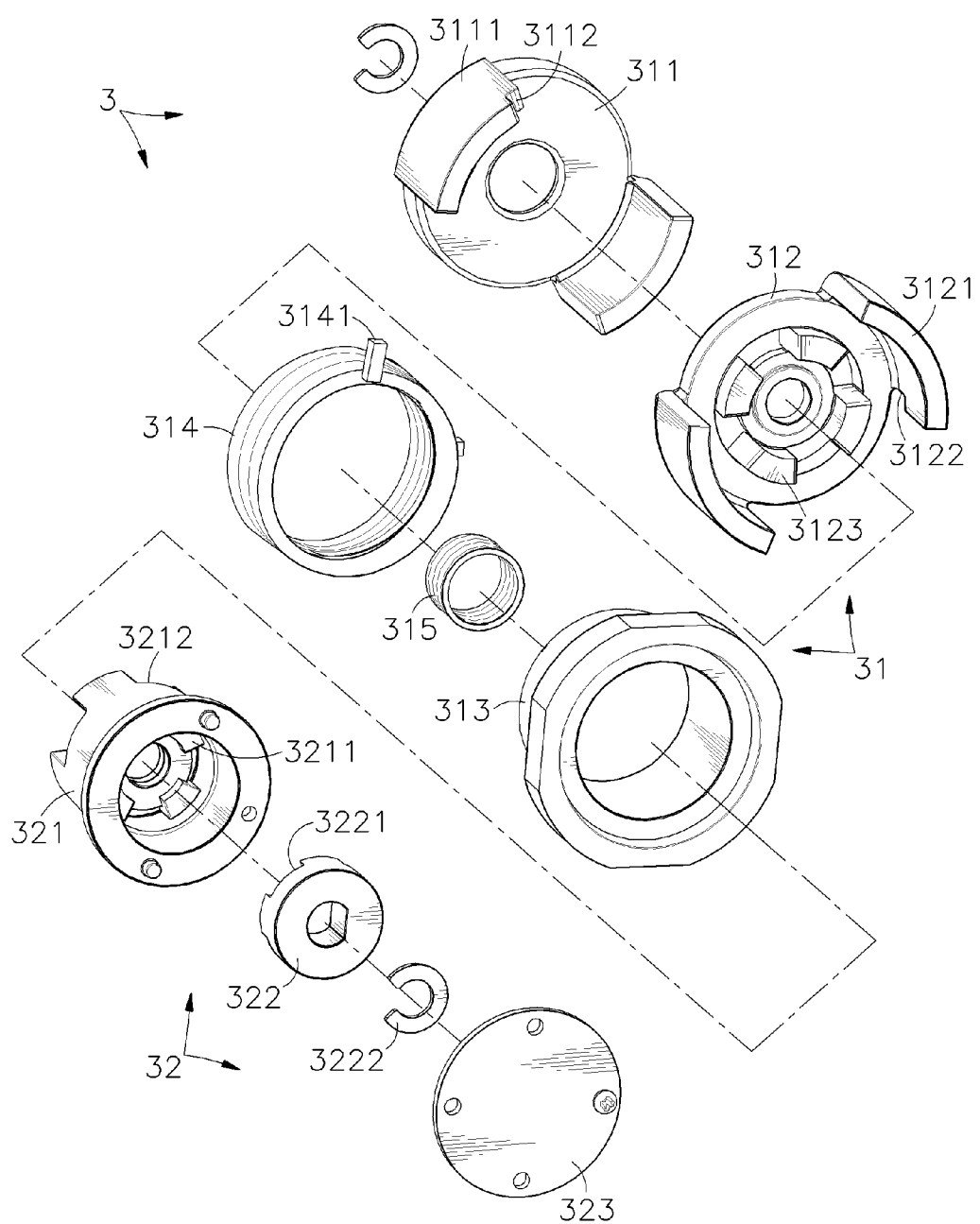
FIG. 4 is an exploded view of the brake module in accordance with the present invention.
Figure 5:
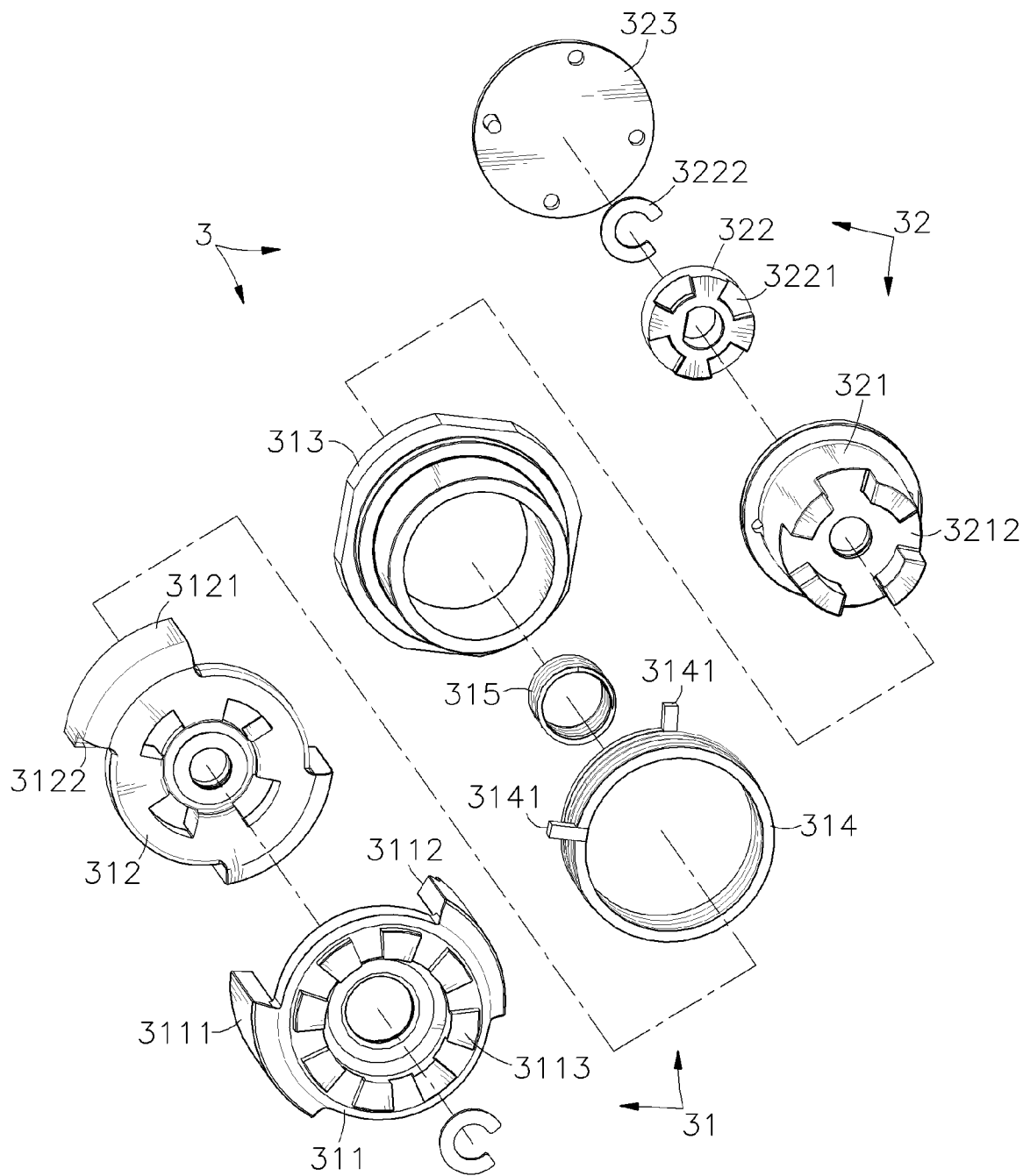
FIG. 5 corresponds to FIG. 4 when viewed from another angle.

(3) In the third operation mode, the design of the brake module 3 allows quick retraction of the extension tube 44. As shown in FIGS. 2 and 3, an emergency pull rod 14 is provided at the base 1 for pulling by the user to bias a lever 141. When pulling the pull rod 14 outwards, the lever 141 is biased and stopped against the cover 323 of the clutch 32 to force the cover 323 and the engagement member 321 inwards. Because the locating block 322 is fixedly secured to the cut plane 221 of the gear shaft 22, moving the engagement member 321 inwards causes separation of the tooth block 3211 of the engagement member 321 from the toothed block 3221 of the locating block 322. At this time, the extension tube 44 can be pushed rapidly backwards without constraint for allowing lowering of the lifted load. Therefore, when an emergency condition happens, the user can pull the pull rod 14 to disengage the locating block 322 from the engagement member 321, allowing quick retraction of the extension tube 44 to lower the lifted load. Therefore, the invention provides a high level of safety.

The actuator is practical for medicare application. As shown in FIG. 7, after installation of the actuator in the lifting device 5, the hardness (not shown) that is provided at the arm member 55 is fastened to the upper body of a patient, and then the actuator is operated to move the extension tube 44 of the linking rod assembly 4 and to further bias the crane beam 54, thereby lifting or lowering the upper body of the patient for enabling a medicare person to turn the body of the patient or to perform a physical therapy conveniently. This application is simple an application example of the present invention. The actuator can also be used in a motorized bed, hospital bed, an electrical door, or any other device that is to be closed or opened through a lifting/lowering action.

The scope of the spirit the present invention is that the base 1 accommodates the transmission gear set 2, the brake module 3 and the linking rod assembly 4 in the accommodation chamber 10, and holds the motor 11 on the top side for rotating the worm 111 that is meshed with the worm gear 21 of the transmission gear set 2 for rotating the brake module 3 during rotation of the worm 111; the transmission gear set 2 has its gear shaft 22 pivotally connected to the worm gear 21 and the brake module 3 and its output gear 23 fixedly mounted on the gear shaft 22; the linking rod assembly 4 has the driven gear 41 meshed with the output gear 23, the screw rod 42 fixedly connected to the driven gear 41, the movable block 43 threaded onto the screw rod 42 for moving the extension tube 44 in or output of the sleeve 12 during rotation of the screw rod 42. The arrangement of the transmission gear set 2 and the brake module 3 relative to the linking rod assembly 4 allows the length of the linking rod assembly 4 to be maximized. Further, the transmission design between the linking rod assembly 4 and the transmission gear set 2 effectively buffers the extension tube 44 against an external force that is applied to the extension tube 44, avoiding direct transfer of transient force through the transmission gear set 2 to the brake module 3 to damage the internal parts of the brake module 3.

In conclusion, the invention provides an actuator for lifting device that has the following advantages and features:

1. The transmission gear set 2 and the brake module 3 are arranged in a parallel manner relative to the linking rod assembly 4 for transferring a rotary driving force to the driven gear 41 of the linking rod assembly 4 so that the moving range of the movable block 43 on the screw rod 42 of the linking rod assembly 4 can be maximized, i.e., the stroke of the extension tube 44 can be maximized, enhancing the performance of the actuator.

2. The transmission gear set 2 and the brake module 3 are arranged in a parallel manner relative to the linking rod assembly 4 such that when the extension tube 44 of the linking rod assembly 4 is forced backwards by an external force, the driven gear 41 will be rotated with the screw rod 42 to rotate the output gear 23 of the transmission gear set 2 and then the clutch 32 of the brake module 3 causing the torsional spring 314 of the stop device 31 to be fastened tight to the periphery of the locating tube 313 to provide braking action.

This design enables any external force to be effectively buffered, preventing direct transfer of any external force through the transmission gear set 2 to the brake module 3 to damage the brake module 3.

3. By means of the wide and thick configurations of the protruding strips 3111 and 3121 of the first push block 311 and second push block 312 of the stop device 31 of the brake module 3, the protruding strips 3111 and 3121 of the first push block 311 and second push block 312 will not break or deform during rotation of the first push block 311 and the second push block 312 to push the end portions 3141 of the torsional spring 314.

A prototype of actuator has been constructed with the features of FIGS. 1~10. The actuator functions smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An actuator used in a lifting device, comprising:
a base defining an accommodation chamber;
a motor mounted on said base;
a worm suspended in said accommodation chamber and rotatable by said motor;
a transmission gear set mounted in said accommodation chamber, said transmission gear set comprising a gear shaft pivotally mounted in said accommodation chamber inside said base, a worm gear pivotally mounted on said gear shaft and meshed with said worm, an output gear fixedly mounted on one end of said gear shaft;
a brake module mounted on said gear shaft of said transmission gear set and accommodated in said accommodation chamber of said base, said brake module comprising a stop device rotatable with said worm gear; and
a linking rod assembly mounted in said accommodation chamber of said base, said linking rod assembly comprising a driven gear meshed with said output gear of said transmission gear set, a screw rod fixedly connected to one side of said driven gear and extending out of said base, a movable block threaded onto said screw rod and movable along said screw rod during rotation of said screw rod, and an extension tube connected to said movable block and movable with said movable block in and out of said base.

2. The actuator as claimed in claim 1, further comprising a sleeve fixedly connected to said base around a part of said linking rod assembly, and two micro switches mounted inside said sleeve near front and rear ends of said sleeve for touching by said movable block to cut off power supply from said motor when said movable block is moved on said screw rod to one of two opposite positions.

3. The actuator as claimed in claim 1, further comprising a shell surrounding said base.

4. The actuator as claimed in claim 1, wherein said worm gear has a plurality of locating holes on one side thereof;
said stop device of said brake module comprises a first push block mounted on said gear shaft, said first push block has a plurality of back teeth respectively engaged into said locating holes of said worm gear.

5. The actuator as claimed in claim 1, wherein said stop device of said brake module comprises a locating tube affixed to said base inside said accommodation chamber.

6. The actuator as claimed in claim 1, wherein said brake module comprises a clutch for controlling engagement between said stop device and said gear shaft.

7. The actuator as claimed in claim 6, wherein said clutch comprises an engagement member rotatably supported on said gear shaft, said engagement member having a ring toothed block located on one side thereof for engagement with said stop device and an internal toothed block, a locating block mounted on said gear shaft and rotatable with said gear shaft, said locating block having a toothed block for engagement with the internal toothed block of said engagement member, a retainer ring fastened to said gear shaft and stopped at one side of said locating block, and a cover covering said engagement member.

8. The actuator as claimed in claim 6, further comprising a lever pivotally mounted inside said base, and a pull rod mounted on said base and operable by a person to bias said lever and to disengage said clutch of said brake module from said gear shaft.

9. The actuator as claimed in claim 6, wherein said gear shaft of said transmission gear set has a cut plane on one end thereof for engagement with said clutch of said brake module.

10. The actuator as claimed in claim 6, wherein said stop device of said brake module comprises a first push block freely rotatably supported on said gear shaft, a second push block freely rotatably supported on said gear shaft, a locating tube affixed to said base, and a torsional spring sleeved onto said locating tube, said first push block comprising a plurality of protruding strips perpendicularly equiangularly extended from the periphery thereof, said second push block comprising a plurality of protruding strips perpendicularly equiangularly extended from the periphery thereof and respectively suspending between in spaces between each two adjacent protruding strips of said first push block.

11. The actuator as claimed in claim 10, wherein said first push block has a notch on one protruding strip thereof;
said second push block has a notch on one protruding strip thereof;
said torsional spring has two opposite end portions respectively attached to the notches of said first push block and said second push block.

12. The actuator as claimed in claim 10, wherein said second push block has a ring toothed block located on one side thereof and a compression spring mounted in said ring toothed block and stopped between said second push block and said clutch.

* * * * *